US010838101B2

(12) United States Patent
Ellis et al.

(10) Patent No.: US 10,838,101 B2
(45) Date of Patent: Nov. 17, 2020

(54) GENERATING IMAGES OF A RESERVOIR BASED ON INTRODUCTION OF A POLYMER-BASED CONTRAST AGENT

(71) Applicant: Saudi Arabian Oil Company, Dhahran (SA)

(72) Inventors: Erika Shoemaker Ellis, Dhahran (SA); Howard Khan Schmidt, Dhahran (SA); Jason Cox, Ashland, MA (US); Jesus Manuel Felix Servin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 121 days.

(21) Appl. No.: 15/987,331

(22) Filed: May 23, 2018

(65) Prior Publication Data
US 2019/0361141 A1   Nov. 28, 2019

(51) Int. Cl.
*G01V 3/30*   (2006.01)

(52) U.S. Cl.
CPC ..................... *G01V 3/30* (2013.01)

(58) Field of Classification Search
CPC ........................................................ G01V 3/03
See application file for complete search history.

(56) References Cited

U.S. PATENT DOCUMENTS

| 6,615,917 | B2 * | 9/2003 | Bussear | E21B 37/06 166/250.15 |
|---|---|---|---|---|
| 6,645,769 | B2 | 11/2003 | Tayebi et al. | |
| 7,145,341 | B2 | 12/2006 | Ellingsrud et al. | |
| 7,191,063 | B2 | 3/2007 | Tompkins | |

(Continued)

FOREIGN PATENT DOCUMENTS

| WO | WO-2016/160770 A1 | 10/2016 |
|---|---|---|
| WO | WO-2017/066213 A1 | 4/2017 |

OTHER PUBLICATIONS

International Search Report for PCT/IB2018/057703, 6 pages (dated Feb. 4, 2019).
Written Opinion for PCT/IB2018/057703, 11 pages (dated Feb. 4, 2019).
Zidan, H. M. et al., Structural and Electrical Properties of PVA/PVP Blend Doped with Methylene Blue Dye, International Journal of Electrochemical Science, 11: 9041-9056 (2016).

(Continued)

*Primary Examiner* — Tung X Nguyen
*Assistant Examiner* — Feba Pothen
(74) *Attorney, Agent, or Firm* — Choate, Hall & Stewart LLP; Charles E. Lyon, DPhil, JD; Peter Flynn (57) ABSTRACT

An example method includes introducing a solution into at least part of a reservoir. The solution includes a contrast agent and a fluid. The contrast agent includes a polymer having a dielectric constant that may be greater than a predefined value. The example method also includes using at least one EM transmitter antenna to direct a first electromagnetic (EM) signal into the reservoir. The first EM signal passes through the at least part of the reservoir into which the solution was introduced. The first EM signal is received using at least one EM receiver antenna following passage through the at least part of the reservoir. Data is determined that represents a difference between a first travel time of the first EM signal transmitted through the contrast agent in the reservoir and a second travel time of a second EM signal transmitted through water-saturated reservoir rock. Information about a physical feature of the at least part of the reservoir is generated based on the data.

29 Claims, 5 Drawing Sheets

(56) References Cited

U.S. PATENT DOCUMENTS

| | | | |
|---|---|---|---|
| 7,453,265 B2 * | 11/2008 | Johnstad | E21B 47/042 |
| | | | 324/324 |
| 8,664,586 B2 | 3/2014 | Schmidt | |
| 2005/0092487 A1 * | 5/2005 | Banning | G01V 3/28 |
| | | | 166/254.1 |
| 2014/0347055 A1 | 11/2014 | Schmidt | |
| 2015/0057196 A1 * | 2/2015 | Debord | C09K 8/685 |
| | | | 507/213 |
| 2015/0167459 A1 * | 6/2015 | Sen | E21B 47/0002 |
| | | | 166/254.1 |
| 2015/0285612 A1 * | 10/2015 | Miles | G01V 3/165 |
| | | | 702/150 |
| 2018/0003848 A1 | 1/2018 | Schmidt et al. | |

OTHER PUBLICATIONS

Al-Shehri, A.A. et al., Illuminating the Reservoir: Magnetic NanoMappers, SPE Middle East Oil and Gas Show and Exhibition held in Manama, Bahrain, SPE 164461, 10 pages (Mar. 10-13, 2013).

Bordi, F. et al., Radiowave Dielectric Properties of Xanthan in Aqueous Solutions, J. Phys. Chem., 99: 274-284 (1995).

Burtmana, V. and Zhdanova, M.S. Induced polarization effect in reservoir rocks and its modeling based on generalized effective-medium theory, Resource-Efficient Technologies, 1: 34-48 (2015).

Marsala, A.F. et al., First Borehole to Surface Electromagnetic Survey in KSA: Reservoir Mapping and Monitoring at a New Scale, Society of Petroleum Engineers, SPE 146348, 9 pages (2011).

* cited by examiner

GENERATING IMAGES OF A RESERVOIR BASED ON INTRODUCTION OF A POLYMER-BASED CONTRAST AGENT

TECHNICAL FIELD

This specification relates generally to processes for generating images of a reservoir based on introduction of a polymer-based contrast agent.

BACKGROUND

An understanding of the subsurface geology of a subterranean formation or a reservoir may be beneficial prior to drilling a well. For example, understanding how water travels through a formation may be a factor in determining where to place the well. Imaging techniques may be used to generate images of a subsurface geology based on signals transmitted into the formation or the reservoir. The images that are generated may be displayed or analyzed prior to drilling.

SUMMARY

An example method includes introducing a solution into at least part of a reservoir. The solution includes a contrast agent and a fluid. The contrast agent includes a polymer having a dielectric constant that may be greater than a predefined value. An example of the predefined value may be the dielectric constant of water. The example method also includes using at least one EM transmitter antenna to direct a first electromagnetic (EM) signal into the reservoir. The first EM signal passes through the at least part of the reservoir into which the solution was introduced. The first EM signal is received using at least one EM receiver antenna following passage through the at least part of the reservoir. Data is determined that represents a difference between a first travel time of the first EM signal transmitted through the reservoir and a second travel time of a second EM signal transmitted through the reservoir. Information about a physical feature of the at least part of the reservoir is generated based on the data. The example method may include one or more of the following features, either alone or in combination.

The first and second EM signals may include non-continuous EM signals having discernable features, such as a first break, a zero crossing, or a prominent peak, that are usable to define a start time and a stop time. Each of the non-continuous EM signals may include an EM pulse. The EM pulse may include a square wave, or a sinusoidal wave, or a triangular wave. The data may represent a time delay of the first EM signal caused by passage through the at least part of the reservoir introduced with the solution. The time delay may equal a difference in the first travel time when the first EM signal is transmitted through the water saturated reservoir rock containing contrast agent in the reservoir and the second travel time when the second EM signal is transmitted through water saturated reservoir rock without the contrast agent.

The first and second EM signals may have a frequency greater than, or equal to, 10000 Hertz (Hz) (or 10 kiloHertz (kHz)). A frequency of each EM signal transmitted by the at least one EM transmitter antenna may equal a frequency of each corresponding EM signal received by the at least one EM receiver antenna. The dielectric constant of the polymer in the contrast agent may be greater than, or equal to, one hundred (100). The information may include a spatial map representing the at least part of the reservoir. The information may represent movement of fluid through the reservoir during a flood condition.

The at least one EM transmitter antenna may be located in a producer well of the reservoir. The at least one EM receiver antenna may be located in an injector well of the reservoir. The EM receiver antenna may be configured to receive the EM signal following passage through the at least part of the reservoir between the producer well and the injector well. The at least one EM receiver antenna may be located on the surface of the reservoir. The EM receiver antenna may be configured to receive the EM signal following passage through the at least part of the reservoir between the producer well and surface of the reservoir.

The example method also includes moving the at least one EM transmitter antenna after transmitting the first EM signal from a first location in the producer well to a second location in the producer well in order to generate data near the second location in the producer well. The example method also includes moving the at least one EM receiver antenna after receiving the first EM signal from a first location to a second location in order to in order to generate data near the second location.

An example system includes an injector configured to introduce a solution into at least part of a reservoir. In some examples, a way of introducing is injecting. The solution may include a contrast agent and a fluid. The contrast agent includes a polymer having a dielectric constant that is greater than a predefined value. At least one EM transmitter antenna is configured to direct a first electromagnetic (EM) signal into the reservoir. The first EM signal passes through the at least part of the reservoir. At least one EM receiver antenna is configured to receive the first EM signal following passage through the at least part of the reservoir. One or more processing devices are configured to determine a time delay representing a difference between a first travel time of the first EM signal transmitted through the reservoir and a second travel time of a second EM signal transmitted through the reservoir, and to generate information about a physical feature of the at least part of the reservoir based on the time delay. The example method may include one or more of the following features, either alone or in combination.

For example, the polymer may be guar gum, or poly vinyl alcohol (PVA), or poly vinyl pyrrolidone (PVP), or FLOPAAM® AN 132, or FLOPAAM® AN 132 VHW, or FLOPAAM® AN 132 SH, or a zwitterionic di-polar or neutral charged polymer, where the polymer is configured for use in EM mapping applications in a frequency range of 10 kHz to 1 MHz. For EM mapping applications in a frequency range of 10 kHz to 100 kHz, the polymer may be guar gum, or poly vinyl alcohol (PVA), or poly vinyl pyrrolidone (PVP). For EM mapping applications in a frequency range of 100 kHz to 1 megahertz (MHz), the polymer may be FLOPAAM® AN 132, or FLOPAAM® AN 132 VHW, or FLOPAAM® AN 132 SH, or a zwitterionic di-polar or neutral charged polymer. The dielectric constant may be greater than or equal to one hundred (100). The molecular weight is in the range of 10 kilo dalton (kDa) to 10 mega dalton (MDa).

The first and second EM signals may be a non-continuous EM signal in order to establish a start time and a stop time of the EM signals. The non-continuous EM signal may be an EM pulse. The EM pulse may be a square wave, or a sinusoidal wave, or a triangular wave.

The time delay may correspond to a difference in the first travel time when the first EM signal is transmitted through the contrast agent in the reservoir and the second travel time when the second EM signal is transmitted through water-saturated reservoir rock. The at least one EM receiver antenna may be configured to receive each EM signal at a frequency equal to a frequency of each corresponding EM signal transmitted by the at least one EM transmitter antenna. The information may include a spatial map representing the at least part of the reservoir. The information may represent movement of a fluid through the reservoir during a flood condition.

The at least one EM transmitter antenna may be located in a producer well of the reservoir. The at least one receiver may be located in an injector well of the reservoir. The at least one EM receiver antenna may be located on a surface above at least part of the reservoir. The EM receiver antenna may be configured to receive the EM signal following passage through the at least part of the reservoir between a producer well and the surface. The at least one EM transmitter antenna may be physically movable after transmitting the first EM signal from a first location to a second location in order to generate data at the second location. The at least one EM receiver antenna may be physically movable after receiving the first EM signal from a first location to a second location in order to in order to generate data at the second location.

Advantages of using a polymer-based contrast agent for EM mapping may include one or more of the following. Use of a polymer-based contrast agent having a high dielectric constant may improve the range of frequencies that can be used for EM mapping and may provide enhanced stability. For example, some polymer-based contrast agents may be less susceptible to aggregation or flocculation. Also, polymer-based contrast agents may retain all of the bulk dielectric properties of their constituent polymer or polymers, thereby resulting in a greater dielectric value, which may contribute to improvement over the range of frequencies and stability. In addition, some polymers may also prevent fingering of introduced water. Fingering is a relatively common condition in reservoirs in which an interface of two fluids, such as oil and water, bypasses sections of reservoir as the fluids move along, creating an uneven, or fingered, profile. Some polymers when dissolved in one of the fluids, for example water, may change the mobility of the polymer water. This change in mobility due to addition of some polymers, for example, may improve the difference in mobility between polymer water and the second fluid, for example oil, that may reduce fingering and increase the sweep efficiency.

Advantages of the example systems and processes described in this specification may also include one or more of the following. The example systems and processes may result in improved signal-to-noise ratio and, therefore, improve the overall quality and resolution of imaging. High-dielectric polymer solutions may improve the range of frequencies that can be used for EM mapping and are stable. Further, only small amounts may be needed to achieve high dielectric properties (for example, less than one weight percent).

Any two or more of the features described in this specification, including in this summary section, may be combined to form implementations not specifically described in this specification.

At least part of the methods, systems, and apparatus described in this specification may be controlled by executing, on one or more processing devices, instructions that are stored on one or more non-transitory machine-readable storage media. Examples of non-transitory machine-readable storage media include read-only memory, an optical disk drive, memory disk drive, random access memory, and the like. At least part of the methods, systems, and apparatus described in this specification may be controlled using a computing system comprised of one or more processing devices and memory storing instructions that are executable by the one or more processing devices to perform various control operations.

The details of one or more implementations are set forth in the accompanying drawings and the description subsequently. Other features and advantages will be apparent from the description and drawings, and from the claims.

DESCRIPTION OF THE DRAWINGS

Like reference numerals in different figures indicate like elements.

DETAILED DESCRIPTION

Described in this specification are example systems and processes ("the system") for generating images of a reservoir based on introduction of a polymer-based contrast agent into the reservoir. The images may be generated based on electromagnetic (EM) signals transmitted into the reservoir, and through the polymer-based contrast agent. The process of generating images of a reservoir based on electromagnetic (EM) signals transmitted into the reservoir is referred to as EM based mapping. Examples of EM signals that can be used include microwaves, long radio frequency (RF) signals, and short RF signals. Examples of polymer-based contrast agent that may be used include those described in this specification. The polymers used in the contrast agent may have a relatively high dielectric constant compared to the dielectric constant of the formation water (approximately 70 to 80). In some examples, "high" is a relative term, and does not require any particular value or values.

In operation, the EM signals are transmitted through the reservoir so that the EM signals pass through the polymer-based contrast agent in the reservoir. Passage through the contrast agent reduces the speed of the EM signals. The speed with which the EM signal passes through the water saturated reservoir rock is detectable and measurable. The time difference between an EM signal that passes through a portion of the formation that does not have the polymer-based contrast agent and an EM signal that passes through a portion of the formation that does have the contrast agent is determinable. The EM signals are transmitted from at least one EM transmitter antenna located, for example, in at least a part of the reservoir, and are received by at least one EM receiver antenna located, for example, in a different part of the reservoir than the EM transmitter antenna. The EM signals transmitted and received through various parts of the reservoir are used to determine travel times through the different parts of the reservoir. In some implementations, a difference in a travel time of an EM signal through part of the reservoir not containing the polymer-based contrast agent and a travel time of a second EM signal through the same part of the reservoir containing the polymer-based contrast agent corresponds to the time delay. One or more processing devices—examples of which are described subsequently—process signals in order to determine time delays and to generate an EM map of the reservoir based on the time delays.

Figure 1:
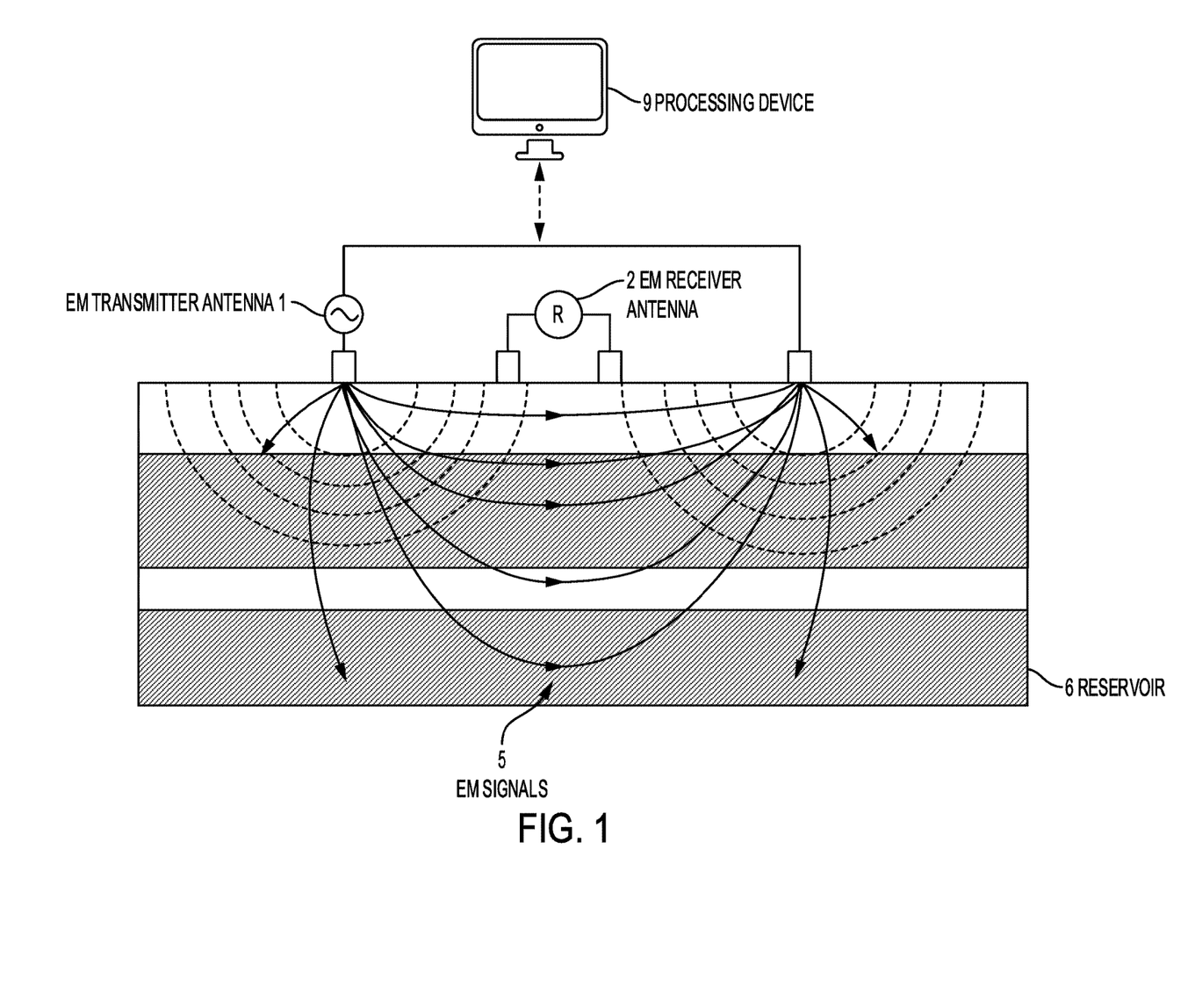
FIG. 1 is a cross-sectional block diagram of an example reservoir configuration having transmitter and EM receiver antennas.

Referring to FIG. 1, an example system for generating images using EM signals includes at least one EM transmitter antenna 1. EM signals 5 are generated by a source, and are transmitted by EM transmitter antenna 1 through a part of reservoir 6 containing the polymer-based contrast agent. The source configured to generate the EM signals may be located down-hole, at the surface, or at any other appropriate location. The transmitted EM signal is received by at least one EM receiver antenna 2 following passage through the polymer-based contrast agent. The transmitted EM signal, the received EM signal, or both may be monitored and recorded by appropriate electronics. For example, a digital signal processor (DSP) may be configured to monitor, or to record, or to monitor and to record data representing transmitted and received EM signals. One or more processing devices 9—such as computing system—may be configured to EM-map the reservoir by determining data representing a time delay between the transmitted EM signal and the received EM signal, and by generating information about a physical feature of the reservoir based on the time delay. The time delay may be based on a difference between an expected travel time of the transmitted EM signal absent the polymer-based contrast agent and an actual travel time of the received EM signal in the presence of the polymer-based contrast agent. In some implementations, the example system of FIG. 1 may be used with frequencies in the range of 1 Hertz (Hz) to 1 kiloHertz (kHz) for electromagnetic induced polarization measurement.

In some implementations, the system is used after drilling a wellbore. In an example, an injector is configured to introduce the polymer-based contrast agent into at least part of a reservoir that has been made accessible by the drilling. In some examples, a way of introducing is injecting. The polymer-based contrast agent is introduced as part of a solution containing the contrast agent and a fluid, such as water. The contrast agent may be, or include, a polymer having a dielectric constant that is greater than a predefined value. An example of the predefined value may be the dielectric constant of water. The dielectric constant of the contrast agent may improve a contrast between fluid, such as water or hydrocarbon, in the reservoir and the solution introduced in the reservoir. To introduce the solution, one or more pumps may be used to force the solution into the reservoir. Any appropriate introduction methods or techniques may be used. In some examples, a way of introducing is injecting.

Following introduction, one or more components of the system may be lowered into the wellbore. In some implementations, for example, EM transmitter antenna 1 may be lowered from a wellhead into a producer wellbore using appropriate technologies. An example producer wellbore is used to remove fluids out of the reservoir. Similarly, EM receiver antenna 2 may be lowered from the wellhead into an injector wellbore using appropriate technologies. An example injector wellbore pumps fluids such as water, surfactants, foams, carbon dioxide ($CO_2$), oil-miscible hydrocarbons, and oil-miscible polymers, into a reservoir to maintain reservoir pressure and to facilitate displacement of residual trapped oil. Thus, in an example, the EM transmitter antenna may be located inside a producer wellbore, and the EM receiver antenna may be located inside an injector wellbore. In some implementations, the EM transmitter antenna may be located inside the producer wellbore, and the EM receiver antenna may instead be located at a surface, in proximity to the wellhead. Generally, the EM transmitter antenna may be located at any appropriate location that enables transmission of EM signals through the polymer-based contrast agent in the reservoir; and the EM receiver antenna may be located at any appropriate location that enables reception of EM signals that passed through the polymer-based contrast agent in the reservoir.

EM transmitter antenna 1 is configured to direct an EM signal 5 into the part of the reservoir containing the polymer-based contrast agent. The EM signal is applied at an appropriate power, for an appropriate duration, and at a known transmission frequency. For example, the power of the applied EM signal may be in the kilowatt (kW) to Megawatt (MW) range. For example, the power of the applied EM signal may be 0.1 kW, 0.2 kW, 0.5 kW, 1 kW, 10 kW, 100 kW, 1 MW, 10 MW, or 100 MW. The EM signals may be applied for various durations. For example, the EM signals may be applied for durations such as minutes, seconds, milliseconds, microseconds, or nanoseconds. In some implementations, the EM signal output by the transmitter may be a non-continuous EM signal. A signal that is non-continuous may be used in order to establish a start time and a stop time of the signal. Examples of non-continuous signals include signals that have features that can be distinguished. For example, non-continuous signals include a pulse, or a non-continuous square wave, or a non-continuous sinusoidal wave, or a non-continuous triangular wave. In some implementations, the EM signal output by the transmitter may be a continuous EM signal. A signal that is continuous may be used in order to establish a phase difference between the EM signal output by the transmitter and the EM signal received by a receiver. Examples of continuous signals include signals that are applied for extended periods of time. For example, continuous signals may be applied for a few microseconds, milliseconds, seconds, or minutes. Continuous signals for example include a continuous square wave, or a continuous sinusoidal wave, or a continuous triangular wave. Signal transmission frequency may be based on factors such as a type of reservoir being mapped, a type of wellbore, rock and materials present in the formation, or a content of solution introduced into the reservoir. For example, transmission frequency may be greater than 1 Hz, or greater than 100 Hz, or greater than 1 kHz, or greater than 10 kHz, or greater than 100 kHz, or greater than 1 MHz. In some implementations, transmission frequency may be between 1 Hz and 100 kHz. In some implementations, the transmission frequency may be less than 10 MHz.

In some implementations, EM receiver antenna 2 is configured to receive the transmitted EM signal 5 following passage through the polymer-based contrast agent. The frequency of the received EM signal 5 may be the same as the frequency of the transmitted EM signal, or may be within an acceptable tolerance of the frequency of the transmitted EM signal. As explained previously, the processing device is configured—for example, programmed—to determine data representing signal timing. The processing device may process the data to generate information about a physical feature of the at least part of the reservoir based on the data. For example, the physical feature may include the subsurface geology of the reservoir such as structural features of the reservoir or the chemical composition of the reservoir, content of the reservoir such as fluid or other materials, a fluid path through the reservoir, or any combination of these or other appropriate features.

Figure 2:
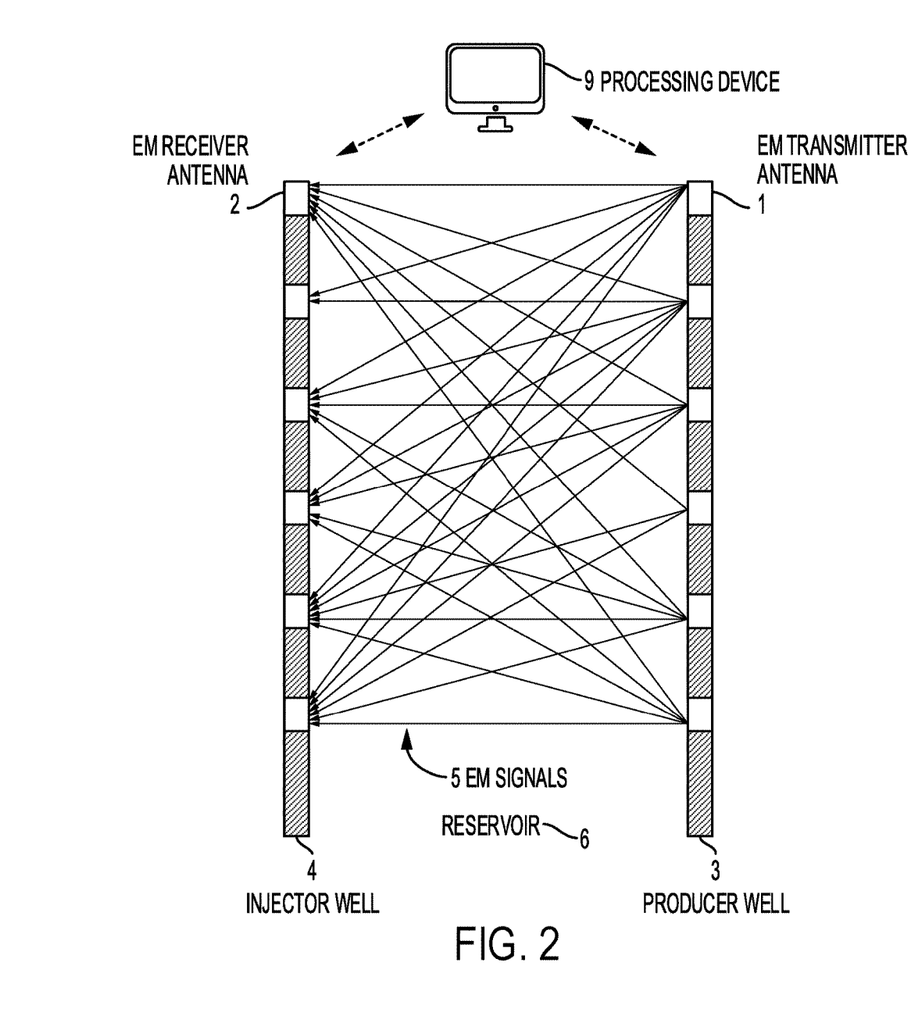
FIG. 2 is a cross-sectional block diagram of an example reservoir containing an example cross-well electromagnetic (EM) interrogation unit.

As described previously, some components of the system may be lowered into the wellbore of a reservoir. For example, referring to FIG. 2, EM transmitter antenna 1 may be located in producer well 3 in reservoir 6, and may be configured to transmit EM signals 5 at a frequency through at least part of reservoir 6 near producer well 3. EM receiver antenna 2 is located in injector well 4 in reservoir 6 and may be configured to receive EM signals 5 at the same frequency as the transmitted EM signal following passage through the polymer-based contrast agent in reservoir 6 between producer well 3 and injector well 4. After the EM signal is received by the EM receiver antenna, the transmitter and the EM receiver antennas may be physically moved. For example, the EM transmitter antenna may be physically moved after transmitting the EM signal, from a first location in the producer well to a second location in the producer well in order to generate data at or near the second location in the producer well. For example, the second location of the EM transmitter antenna in the producer well may be located uphole from the first location, downhole from the first location (as shown in FIG. 2), or lateral to the first location. In some implementations, the first and second locations may be the same locations. The EM receiver antenna may also be physically moved after receiving the EM signal from a first location in the injector well to a second location in the injector well in order to generate data near the second location in the injector well. For example, the second location of the EM receiver antenna in the injector well may be located, uphole from the first location, downhole from the first location (as shown in FIG. 2), or lateral to the first location. The second locations of the transmitter and EM receiver antennas are selected using appropriate techniques. For example, the second location may be selected based on software-based techniques or existing EM maps that were generated previously. In general, the second, and subsequent, locations of the transmitter and receivers antennas may be selected to obtain data to generate images for different parts of the reservoir or to enhance existing images of the reservoir.

After EM transmitter antenna 1 and EM receiver antenna 2 are physically moved, a second EM signal is directed from the transmitter in the second location of the producer well into reservoir and through the polymer-based contrast agent. The frequency of the second EM signal may be the same as the previously transmitted EM signal from the first location in the producer well. For example, the transmission frequency of the second EM signal may be greater than 1 Hz, or greater than 100 Hz, greater than 1 kHz, or greater than 10 kHz, or greater than 100 kHz, or greater than 1 MHz. The transmission frequency of the EM signal may be less than 10 MHz, or less than 100 MHz. The EM receiver antenna in the second location of the injector well receives the second EM-signal following passage through the part of the reservoir containing the polymer-based contrast agent. The frequency of the second EM signal received by the EM receiver antenna following passage through the part of the reservoir containing the polymer-based contrast agent may be equal to the frequency of the second EM signal transmitted by the EM transmitter antenna into the reservoir, but need not necessarily be equal to the EM signal transmitted previously from the first location.

Figure 3:
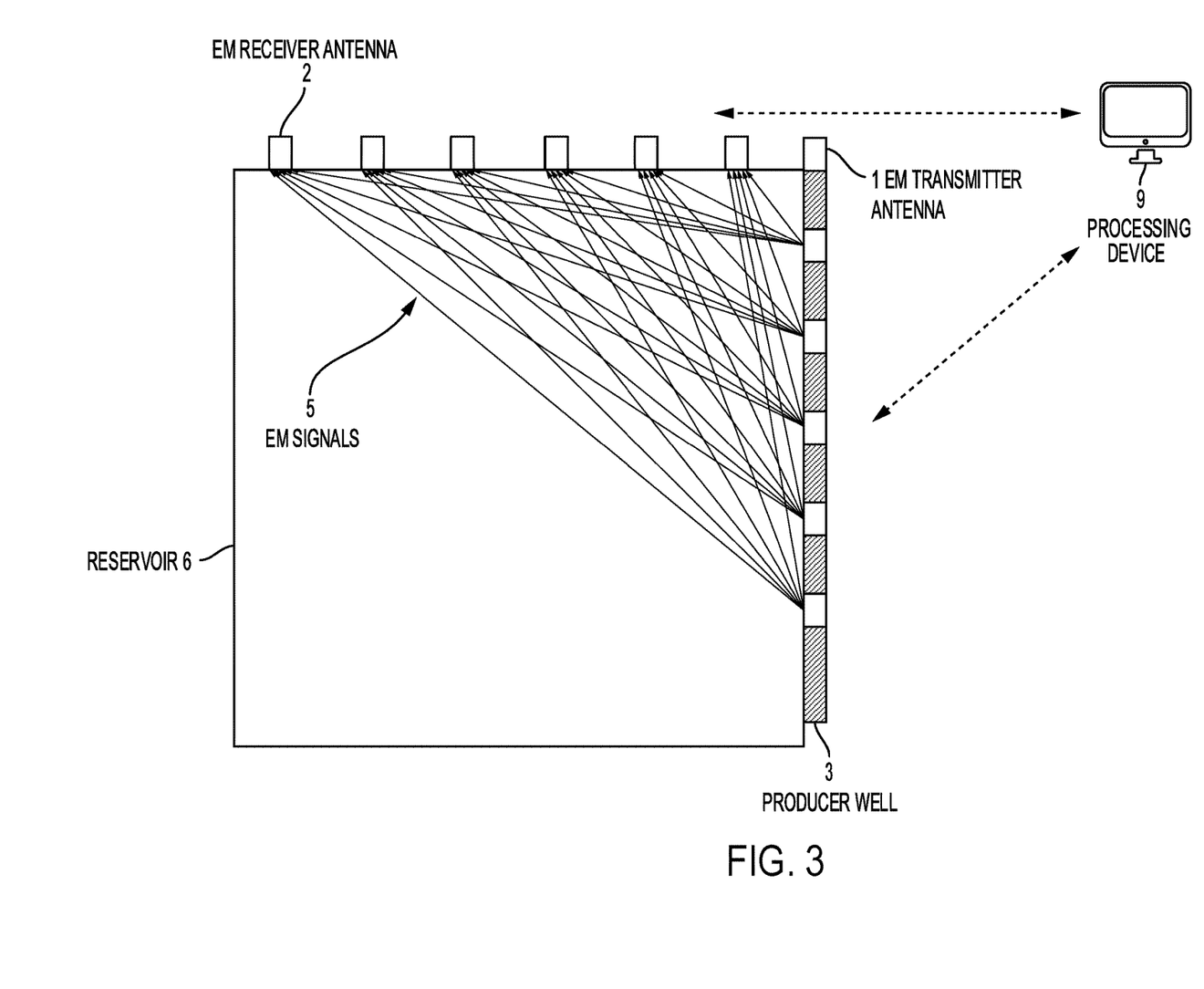
FIG. 3 is a cross-sectional block diagram of an example reservoir containing an example borehole-to-surface EM (BSEM) interrogation unit.

In some implementations, the EM receiver antenna may be located on the surface of the reservoir near the wellhead. For example, referring to FIG. 3, EM transmitter antenna 1 may be located in producer well 3 in reservoir 6, and may be configured to transmit EM signals 5 at a frequency through at least part of reservoir 6 containing the polymer-based contrast agent near producer well 3. EM receiver antenna 2 may be located on the surface of reservoir 6, and may be configured to receive EM signals 5 at the same frequency as the transmitted EM signal, following passage through the at least part of the reservoir 6 between producer well 3 and the surface of the reservoir. After transmitting and receiving the EM signal, the transmitter and receiver may be physically moved. As described previously, for example, the EM transmitter antenna located in the producer well may be moved to a second location in the producer well (for example, downhole from the first location as shown in FIG. 3). The EM receiver antenna may be physically moved to a second location on the surface of the reservoir. For example, the second location of the EM receiver antenna on the surface of the reservoir may be to the left of the first location, to the right of the first location, or same as the first location. As described previously, after the EM transmitter antenna and the EM receiver antenna are physically moved, a second EM signal is directed from the EM transmitter antenna in the second location of the producer well into the reservoir for further EM mapping.

The EM transmitter antenna, or the EM receiver antenna, or the EM transmitter antenna and the EM receiver antenna may be physically moved multiple times during the EM mapping process. For example, the EM transmitter antenna, or the EM receiver antenna, or the EM transmitter antenna and the EM receiver antenna may be moved at least two (2) times, or at least five (5) times, or at least ten (10) times, or at least twenty (20) times, or at least fifty (50) times, or at least one hundred (100) times, or at least two hundred (200) times. Generally, the EM transmitter antenna, the EM receiver antenna, or both, may be moved any appropriate number of times needed to obtain a sufficient amount of information, at a sufficient resolution, to map a target part of the reservoir.

In some implementations, a non-continuous EM signal is transmitted by the EM transmitter antenna, travels through part of the reservoir containing the polymer-based contrast agent, and is received by the EM receiver antenna. To determine a time delay of the received non-continuous EM signal relative to the transmitted non-continuous EM signal, in some implementations, a start time, a stop time, or both of each of the transmitted EM signal and the received EM signal are established and recorded. A start time may be defined as the time when a rising edge of an EM signal is recorded. A stop time may be defined as the time when a falling edge of an EM signal is recorded. In some implementations, the start time may be defined as the time when the falling edge of an EM signal is recorded and the stop time may be as the time when a rising edge of an EM signal is recorded. In some implementations a travel time is calculated based on the start and stop times. For example, the travel time of an EM signal through the reservoir may be determined as a difference between the start time of the received EM signal and the start time of the transmitted EM signal. In some implementations, the travel time of an EM signal through the reservoir may be determined as a difference between the stop time of the received EM signal and the stop time of the transmitted EM signal. The units of measurement for start, stop, and travel times of the EM signals may be minutes, or seconds, or milliseconds, or microseconds, or nanoseconds, or picoseconds.

In some implementations, a continuous EM signal is transmitted by the EM transmitter antenna, travels through part of the reservoir containing the polymer-based contrast agent, and is received by the EM receiver antenna. To determine a phase difference of the received continuous EM signal relative to the transmitted continuous EM signal, in some implementations, a phase of each of the transmitted EM signal and the received EM signal are established and recorded. In some implementations a phase difference is calculated based on the phase of the transmitted continuous EM signal and the phase of the received continuous EM signal. For example, the phase difference of an EM signal due to passage through the reservoir may be determined as a difference between the phase of the transmitted EM signal and the phase of the received EM signal. The units of measurement for phase and phase difference of the EM signals may be degrees or radians.

In some implementations, the processing device may be configured—for example programmed—to determine a time delay data caused by passage of the EM signal through the polymer-based contrast agent in the reservoir. In some examples, the data may represent a difference in a travel time of the EM signal through the polymer-based contrast agent in the reservoir, and a travel time of the EM signal through a water saturated reservoir rock in the reservoir that does not contain the contrasting agent. In some examples, the data may represent a phase difference of the EM signal received by the EM receiver antenna following passage through the reservoir, and the same EM signal transmitted by the EM transmitter antenna into the reservoir. Other appropriate metrics may also be used to determine the delay experienced by the EM signal in the reservoir.

As described previously, a computing system comprised of one or more processing devices is configured to generate an EM map representing the entire reservoir, the part of the reservoir containing the polymer-based contrast agent, or both. The EM map may be of at least part of the reservoir that is at least 60 feet deep from the surface, or at least 80 feet deep from the surface, or at least 100 feet deep from the surface, or at least 200 feet deep from the surface, or at least 500 feet deep from the surface, or at least 1000 feet deep from the surface. In general, the system may be used to generate EM maps at any appropriate depths from the surface given available technology. In some implementations, the EM is a spatial map that may represent a path, or potential path, of movement of fluid through the reservoir during a flood condition.

Figure 4:
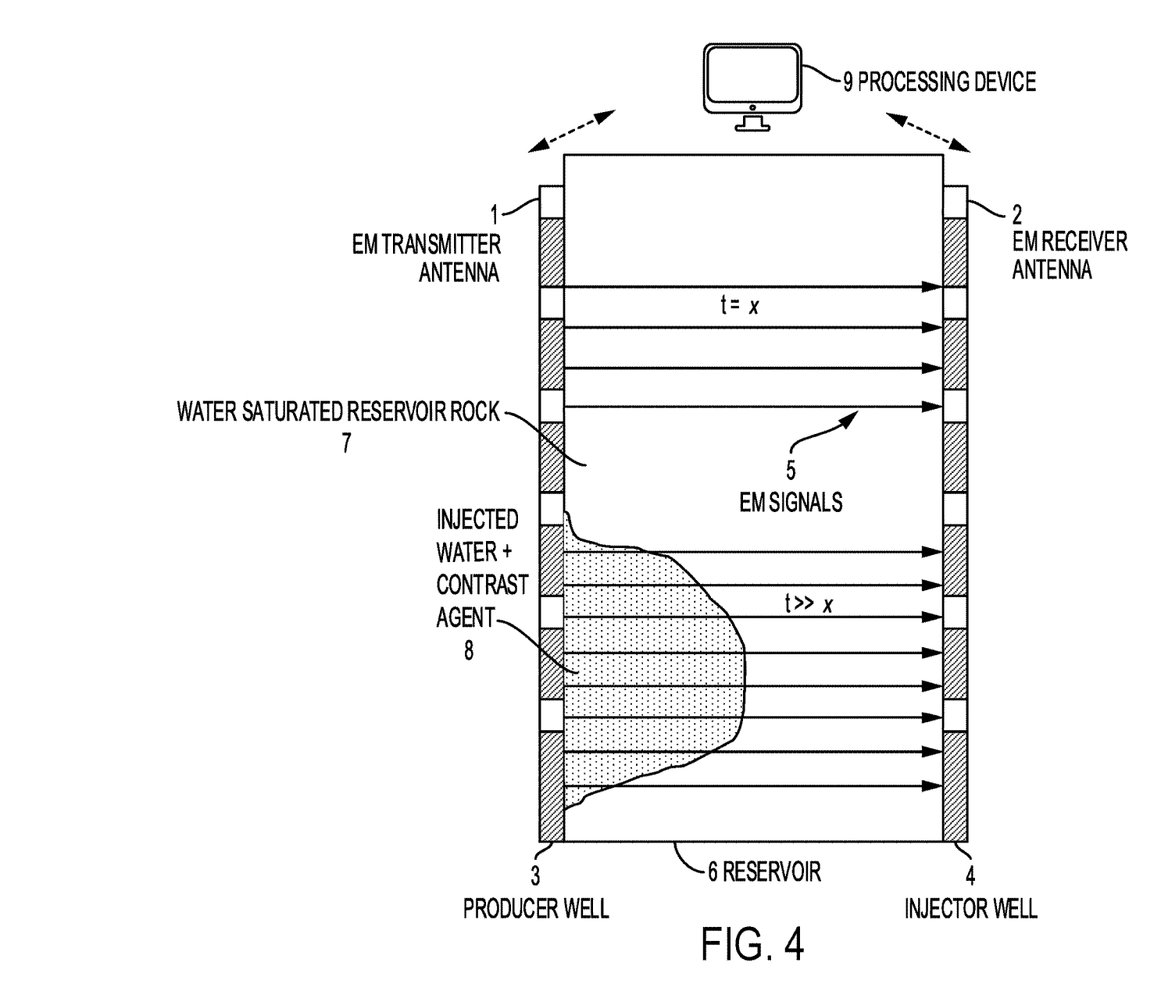
FIG. 4 is a cross-sectional block diagram of an example reservoir illustrating an EM signal time delay due to introduction of polymer-based contrast agent into the reservoir.

FIG. 4 shows a cross-section of a reservoir 6 during the EM mapping process. Referring to FIG. 4, EM signals 5 are transmitted from EM transmitter antenna 1 into part of reservoir 6 containing the polymer-based contrast agent. As discussed previously, EM signals traveling through the reservoir rock saturated with injected water and high-dielectric contrast agent 8 of the reservoir show increased traveling times compared to EM signals traveling through only water saturated reservoir rock 7. The EM signals are received by EM receiver antenna 2. The EM transmitter antenna, or the EM receiver antenna, or the EM transmitter antenna and EM receiver antenna is monitored by processing device 9. The processing device may be configured to determine the time delay or phase difference when the EM signals traveling through the reservoir rock saturated with injected water and high-dielectric contrast agent. Methods of determining the time delay or phase difference data are discussed previously. Processing device 9 may also be configured to invert the time delay or phase difference data to spatial information regarding the physical features of the reservoir using appropriate software technologies. For example, inversion software may be used to invert the data to spatial information.

Figure 5:
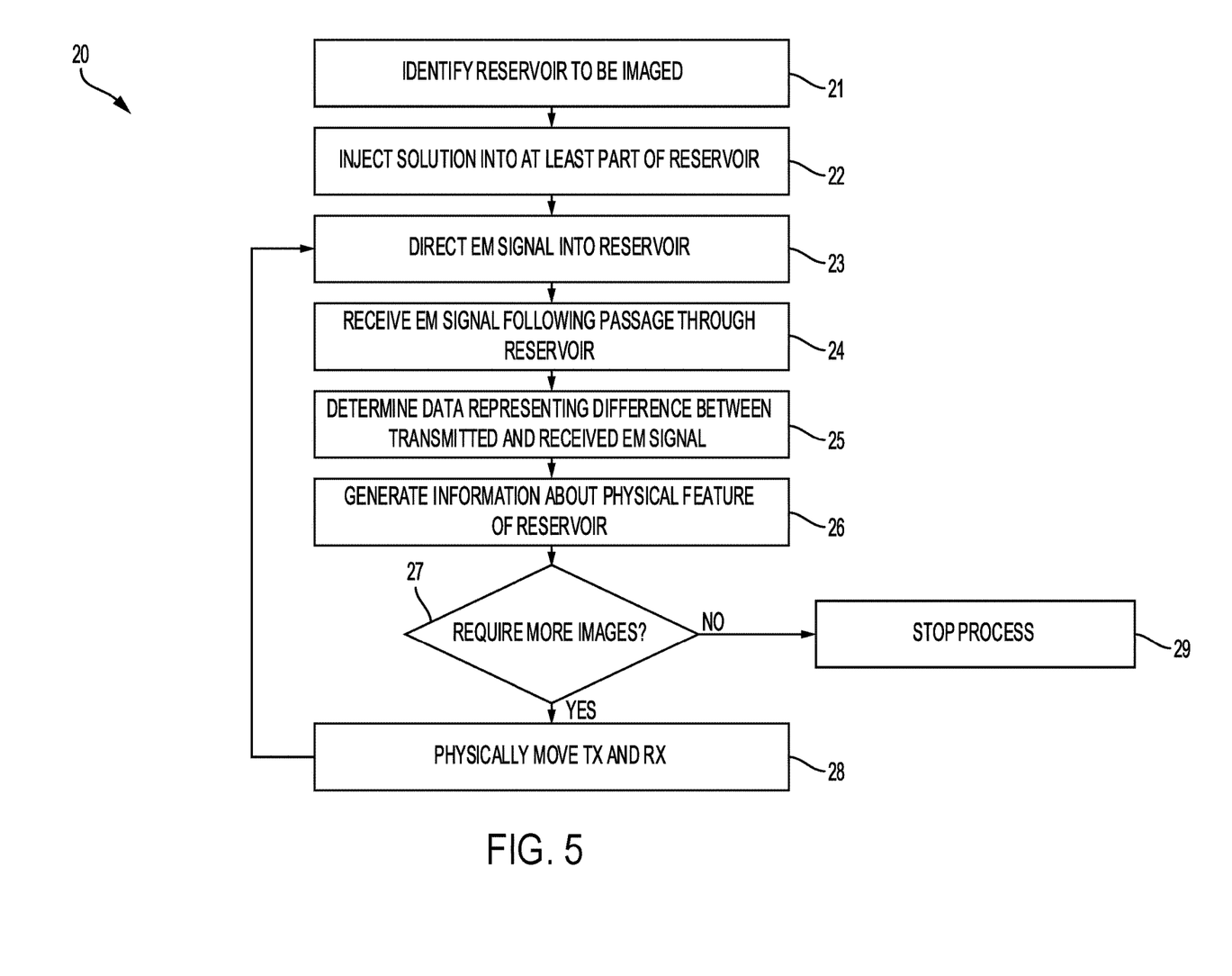
FIG. 5 is a flowchart showing an example process for generating images of a reservoir based on introduction of a polymer-based contrast agent.

Referring to FIG. 5, a process 20 is shown for generating images of a reservoir based on introduction of a polymer-based contrast agent using the techniques described previously. Operation 21 includes identifying a reservoir to be imaged. A reservoir may be identified for mapping based on any appropriate criteria. Operation 22 includes introducing a solution comprised of a contrast agent and fluid into at least part of the reservoir. Examples of the solution are described throughout this specification. Operation 23 includes configuring EM transmitter antenna to direct an EM signal into the reservoir. Techniques and parameters for directing EM signals into at least part of the reservoir to are described previously. In this regard, FIGS. 2 and 3 show the EM transmitter antenna in the producer wellbore directing EM signals into at least part of the reservoir.

Operation 24 includes configuring the EM receiver antenna to receive the EM signals following passage through the part of the reservoir containing the polymer-based contrast agent. Techniques and parameters for receiving EM signals following passage through at least part of the reservoir are described previously. Operation 25 includes determining, using the processing device, data representing a difference between the transmitted EM signal into the reservoir and the received EM signal following passage through at least part of the reservoir. Techniques for determining data from the transmitted and received EM signals are described previously. Data determined may include a time delay and a phase difference. Operation 26 includes executing appropriate instructions on the processing device to generate, based on the data, information about the physical features of the reservoir. Techniques for generating information from the determined data are described previously. These include inverting the data determined from the transmitted and received EM signals.

Operation 27 includes determining if further EM mapping of the reservoir is required. Further EM mapping of the reservoir may be needed to produce a more complete EM map of the reservoir, or to generate better quality images, or both. Operation 28 includes physically moving the EM transmitter (TX) antenna, or the EM receiver (RX) antenna, or EM transmitter antenna and EM receiver antenna, and repeating, as necessary or desired, the operations of transmitting and receiving the EM signals. Each location of the EM transmitter antenna, or the EM receiver antenna, is used to generate information regarding the part of the reservoir between the EM transmitter antenna and the EM receiver antenna. The transmission and receipt of EM signals may be repeated to produce a more extensive EM map of the reservoir, a higher resolution map of the reservoir, or both. The success of imaging the reservoir may be determined and recorded. In this regard, a level of success may be determined by the processing device. The success of imaging the reservoir using EM mapping may be determined based on parameters such as the signal-to-noise ratio of the image obtained, the area of the reservoir image, and the resolution of the image.

Following imaging, operation 29 includes removing the EM transmitter antenna, or EM receiver antenna, or the EM transmitter antenna and the EM receiver antenna from wellbores of the reservoir, and stopping the EM image acquisition process.

Examples of polymers that may be used to produce the polymer-based contrast agent include xanthan gum, guar gum, poly vinyl alcohol (PVA), poly vinyl pyrrolidone (PVP), FLOPAAM® AN 132, FLOPAAM® AN 132 VHW, FLOPAAM® AN 132 SH, or other zwitterionic (di-polar or neutral charged) polymers. The molecular weight is in the range of 10 kilo dalton (kDa) to 10 mega dalton (MDa). A polymer may be used for EM mapping in a range of frequencies depending on the EM time delay caused by the polymer in the range. The EM time delay caused by the polymer at a certain frequency is a function of the dielectric constant of the polymer at the certain frequency. Certain polymers produce larger, or at least discernable, EM signal delays at certain frequencies, as a result of the high dielectric constant of the polymer at the certain frequencies. Selection of a polymer to produce the polymer-based contrast agent may be based on factors such as a dielectric constant of the polymer at the frequency used for EM mapping, and the type of reservoir. Accurate measurement of EM time delays may be based on factors such as the bandwidth of the channel, pulse characteristics, and the detection electronics used. For example, EM time delays may be measured with accuracies of microseconds or nanoseconds.

In some implementations, multiple polymers may be used across the same range of frequencies. For example, xanthan gum, guar gum, poly vinyl alcohol (PVA), poly vinyl pyrrolidone (PVP) may be used in EM mapping applications in the frequency range of 10 kHz to 100 kHz. In some examples, FLOPAAM® AN 132, FLOPAAM® AN 132 VHW, FLOPAAM® AN 132 SH, or other zwitterionic (di-polar or neutral charged) polymers may be used in EM mapping applications in the frequency range of 100 kHz to 1 MHz.

In some examples, the dielectric constant of an example polymer used to produce the polymer-based contrast agent may be greater than 100, or greater than 150, or greater than 200, or greater than 250, or greater than 500, or greater than 1000. In some examples, the dielectric constant of an example polymer used to produce the polymer-based contrast agent may be may be less than 1 million, or less than 2 million, or less than 3 million, or less than 5 million, or less than 10 million.

In some implementations, the relatively high dielectric constant of the polymer used to produce the polymer-based contrast agent may result in greater contrast during EM mapping between water-saturated rock in the reservoir and contrast-agent-saturated reservoir rock. The concentration of the contrast agent solution is appropriately chosen. For example, the concentration of the contrast agent solution may be greater than 0.05 percent-by-weight (wt %), or greater than 0.1 wt %, or greater than 0.2 wt %, or greater than 0.3 wt %, or greater than 0.4 wt %, or greater than 0.5 wt %, or greater than 0.6 wt %, or greater than 0.7 wt %, or greater than 0.8 wt %, or greater than 0.9 wt %, or greater than 1 wt %, or greater than 2 wt %, or greater than 4 wt %, or greater than 5 wt %, or greater than 6 wt %, or greater than 7 wt %, or greater than 7.5 wt %, or greater than 8 wt %, or greater than 9 wt %, or greater than 9.5 wt %. In some implementations, the concentration of the contrast agent solution may be between 0.05 wt % to 10 wt %. In some implementations, the concentration of the contrast agent solution introduced into the reservoir may be greater than the concentration of the contrast agent solution in the formation of the reservoir. For example, this may occur due to dilution of the contrast agent solution after introduction into the reservoir. The concentration of contrast agent solution used may be based on factors such as type of reservoir being mapped, type of rock or other materials in the formation, and EM mapping technique to be used.

The solution containing the polymer-based contrast agent may include multiple contrast agents. For example, the solution may include at least one contrast agent, or at least two contrast agents, or at least three contrast agents, or at least four contrast agents, or at least five contrast agents, or at least ten contrast agents. The additional contrast agents may be polymer-based, have a high dielectric constant, or be both polymer-based and have high dielectric constant. The combination of contrast agents that are selected to increase the total contrast of the reservoir during EM mapping may be based on factors such as the depth of the reservoir to be imaged and the type of reservoir to be imaged. The solution of the contrast agent includes a fluid, as described previously. As noted, the fluid may be water; however, other appropriate fluids may be used, including water-based solutions. The fluid used in preparing the solution introduced into the reservoir may be based on factors such as the type of reservoir being mapped, the type of rock or other materials in the formation, and the EM mapping technique to be used.

Although vertical wellbores are shown in the examples presented in this specification, the example systems and processes described previously may be implemented in wellbores that are, in whole or part, non-vertical. For example, the example processes may be performed in a deviated wellbore, a horizontal wellbore, or a partially horizontal wellbore measured relative to the Earth's surface in some examples.

All or part of the example systems and processes described in this specification and their various modifications (subsequently and collectively referred to as "the system") may be controlled at least in part, by one or more computers using one or more computer programs tangibly embodied in one or more information carriers, such as in one or more nontransitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with controlling the system can be performed by one or more programmable processors executing one or more computer programs to control all or some of the well formation operations described previously. All or part of the processes can be controlled by special purpose logic circuitry, such as, an FPGA (field programmable gate array), an ASIC (application-specific integrated circuit), or both an FPGA and an ASIC.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the processes described without adversely affecting their operation or the operation of the system in general. Furthermore, various separate elements may be combined into one or more individual elements to perform the functions described in this specification. In view of the structure, functions and apparatus of the systems and methods described here, in some implementations.

What is claimed is:

1. A method comprising:
   introducing a solution into at least part of a reservoir, the solution comprising a contrast agent and a fluid, the contrast agent comprising a polymer having a dielectric constant that is greater than or equal to one hundred (100);
   directing, using at least one EM transmitter antenna, a first electromagnetic (EM) signal into the reservoir, the first EM signal passing through the at least part of the reservoir;
   receiving, using at least one EM receiver antenna, the first EM signal following passage through the at least part of the reservoir;
   determining data representing a difference between a first travel time of the first EM signal transmitted through the reservoir and a second travel time of a second EM signal transmitted through the reservoir; and
   generating information about a physical feature of the at least part of the reservoir based on the data,
   where the molecular weight of the contrast agent is in a range from about 10 kilo Dalton (kDa) to about 10 mega Dalton (MDa).

2. The method of claim 1, where the first and second EM signals comprise non-continuous EM signals comprising discernable features that are usable to define a start time and a stop time.

3. The method of claim 2, where each of the non-continuous EM signals comprises an EM pulse.

4. The method of claim 3, where the EM pulse comprises a triangular wave.

5. The method of claim 1, where the data represents a time delay of the first EM signal caused by passage through the at least part of the reservoir introduced with the solution.

6. The method of claim 5, where the time delay equals a difference between the first travel time when the first EM signal is transmitted through the contrast agent in the reservoir and the second travel time when the second EM signal is transmitted through water-saturated reservoir rock.

7. The method of claim 1, where the first and second EM signals have a frequency from about 1 Hz to about 100 kHz.

8. The method of claim 1, where a frequency of each EM signal transmitted by the at least one EM transmitter antenna equals a frequency of each corresponding EM signal received by the at least one EM receiver antenna.

9. The method of claim 1, where the dielectric constant is greater than, or equal to, two hundred (200).

10. The method of claim 1, where the information comprises a spatial map representing the at least part of the reservoir.

11. The method of claim 1, where the information represents movement of fluid through the at least part of the reservoir during a flood condition.

12. The method of claim 1, where the at least one EM transmitter antenna is located in a producer well of the reservoir; and
    where the at least one EM receiver antenna is located in an injector well of the reservoir.

13. The method of claim 1, where the at least one EM transmitter antenna is located in a producer well of the reservoir; and
    where the at least one EM receiver antenna is located on the surface of the reservoir.

14. The method of claim 12, further comprising:
    moving the at least one EM transmitter antenna after transmitting the first EM signal from a first location in the producer well to a second location in the producer well in order to generate data near the second location in the producer well.

15. The method of claim 12, further comprising:
    moving the at least one EM receiver antenna after receiving the first EM signal from a first location to a second location in order to generate data near the second location.

16. A system comprising:
    an injector configured to introduce a solution into at least part of a reservoir, the solution comprising a contrast agent and a fluid, the contrast agent comprising a polymer having a dielectric constant that is greater than or equal to one hundred (100);
    at least one EM transmitter antenna configured to direct a first electromagnetic (EM) signal into the reservoir, the first EM signal passing through the at least part of the reservoir;
    at least one EM receiver antenna configured to receive the first EM signal following passage through the at least part of the reservoir; and
    one or more processing devices configured to determine a time delay representing a difference between a first travel time of the first EM signal transmitted through the reservoir and a second travel time of a second EM signal transmitted through the reservoir, and to generate information about a physical feature of the at least part of the reservoir based on the time delay,
    where the polymer is poly vinyl alcohol (PVA), or poly vinyl pyrrolidone (PVP), or FLOPAAM® AN 132, or FLOPAAM® AN 132 VHW, or FLOPAAM® AN 132 SH, or a neutral charged polymer.

17. The system of claim 16, where the polymer is configured for use in EM mapping applications in a frequency range of 10 kHz to 100 kHz, and where the polymer is FLOPAAM® AN 132, or FLOPAAM® AN 132 VHW, or FLOPAAM® AN 132 SH, or a neutral charged polymer.

18. The system of claim 16, where the dielectric constant is greater than, or equal to, five hundred (500).

19. The system of claim 16, where the first and second EM signals comprise non-continuous EM signals in order to establish a start time and a stop time of each EM signal.

20. The system of claim 19, where the non-continuous EM signal is an EM pulse.

21. The system of claim 20, where the EM pulse is a sinusoidal wave.

22. The system of claim 16, where the time delay corresponds to a difference between the first travel time when the first EM signal is transmitted through the contrast agent in the reservoir and the second travel time when the second EM signal is transmitted through water-saturated reservoir rock.

23. The system of claim 16, where the at least one EM receiver antenna is configured to receive each EM signal at a frequency equal to a frequency of each corresponding EM signal transmitted by the at least one EM transmitter antenna,
where the dielectric constant is greater than or equal to two-hundred and fifty (250).

24. The system of claim 16, where the information comprises a spatial map representing the at least part of the reservoir.

25. The system of claim 16, where the information represents movement of a fluid through the at least part of the reservoir during a flood condition.

26. The system of claim 16, where the at least one EM transmitter antenna is located in a producer well of the reservoir;
where the at least one EM receiver antenna is located in an injector well of the reservoir, and
where the operating power of the at least one EM transmitter antenna is from about 0.1 kW to about 100 MW.

27. The system of claim 17, where the at least one EM transmitter antenna is located in a producer well of the reservoir;
where the at least one EM receiver antenna is located on a surface above the at least part of the reservoir, and
where the operating power of the at least one EM transmitter antenna is from about 10 kW to about 100 kW.

28. The system of claim 16, where the at least one EM transmitter antenna is physically movable after transmitting the first EM signal from a first location to a second location in order to generate data at the second location,
where a concentration of the contrast agent within the solution is greater than about 0.1 percent by weight.

29. The system of claim 16, where the at least one EM receiver antenna is physically movable after receiving the first EM signal from a first location to a second location in order to generate data at the second location.

* * * * *